(12) United States Patent
Yanagase et al.

(10) Patent No.: US 6,262,214 B1
(45) Date of Patent: Jul. 17, 2001

(54) LOWLY BIREFRINGENT POLYMER, PROCESS FOR THE PRODUCTION THEREOF, AND OPTICAL PICKUP LENS

(75) Inventors: Akira Yanagase; Seiji Tone; Toru Tokimitsu, all of Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/297,062

(22) PCT Filed: Oct. 29, 1997

(86) PCT No.: PCT/JP97/03930

§ 371 Date: Apr. 29, 1999

§ 102(e) Date: Apr. 29, 1999

(87) PCT Pub. No.: WO98/18836

PCT Pub. Date: May 7, 1998

(30) Foreign Application Priority Data

Oct. 29, 1996 (JP) .................................................... 8-286821
Apr. 9, 1997 (JP) .................................................... 9-091177

(51) Int. Cl.[7] .................................................... C08F 220/12
(52) U.S. Cl. .................... 526/329.6; 526/266; 526/268; 526/328; 526/328.5; 526/329.6; 526/332
(58) Field of Search .................. 526/266, 268, 526/328, 328.5, 329.6, 332

(56) References Cited

U.S. PATENT DOCUMENTS 4,889,948 * 12/1989 Mathias et al. ........................ 560/181
5,247,035 * 9/1993 Besecke et al. ........................ 526/244

OTHER PUBLICATIONS

Mathias et al., Oolym. Prepr., vol. 29 (1), 1988, "A new Nonhydrolyzable Ether Crosslinking Agent Containing Two Methacrylate Units Linked Through The Alpha–Methyl Carbons", pp. 329–330, 1988.*

* cited by examiner

*Primary Examiner*—Hellen L. Pezzuto
(74) *Attorney, Agent, or Firm*—Oblon, Spivak, McClelland, Maier & Neustadt, P.C.

(57) ABSTRACT

A copolymer having low birefringence substantially consisting of a repeating unit represented by the following general formula (1) and a repeating unit of a (meth)acrylate:

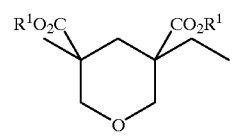

(1)

wherein, $R_1$ represents a hydrogen atom or a hydrocarbon group having 1 to 25 carbon atoms, an alicyclic hydrocarbon group or a substituted hydrocarbon group.). This copolymer has low birefringence and low hydrophilia, is excellent in transparency, heat-resistance and mechanical strength, and can be applied to lenses, optical disks, optical fibers and the like.

6 Claims, 3 Drawing Sheets

LOWLY BIREFRINGENT POLYMER, PROCESS FOR THE PRODUCTION THEREOF, AND OPTICAL PICKUP LENS

TECHNICAL FIELD

The present invention relates to organic polymers suitable for optical use and the like; light-inductive materials available for illumination of various meters, various displays, illumination of signboards, and the like; optical disk substrates and optical disks constituted from specific resins; plastic optical fibers which can be used as optical information communication media and the like; modified polycarbonate sheets having improved weather-resistance and a production method thereof; pickup lenses and lenses used for laser beam printers; resin compositions excellent in optical properties, impact-resistance and heat-resistance and resin compositions excellent in optical properties, weather-resistance and oxidation-degradation-resistance; lamp lenses used for head lamps and fog lamps of automobiles, and signal lamps; and sheet molded articles excellent in light scattering property and heat resistance.

BACKGROUND ART

Methacrylic resins have mechanical properties, molding-processability, weather-resistance and the like in good balance, and are used in a variety of fields as sheet materials or molding materials. Further, methacrylic resins also have excellent optical properties such as transparency, low dispersion, low birefringence and the like. Recently, methacrylic resins have, utilizing such properties, widespread uses such as disk materials of video disks, audio disks, unrewritable disks used in computers, lens materials of video cameras, projection type televisions, light pickup lenses and the like, and various light transmission materials such as optical fibers, optical connectors and the like.

However, methacrylic resins have problems that hygroscopic property is high and heat-resistance is low. Namely, a molded article made of methacrylic resin exhibits size variation and warping by moisture absorption and manifests cracking by repeated cycles of moisture absorption and drying for a long period, and use of methacrylic resins is restricted for some specific articles. Such problems are said to be significant particularly for disk materials, and light pickup lenses and connectors and the like used in such optical systems. Further, use of methacrylic resins in articles used in automobiles is sometimes restricted due to low heat-resistance. Moreover, the same problems are found in acrylic sheets. Recently, lower birefringence is required in optical resin materials such as disk materials, lens materials and the like due to higher density of recording media, and the birefringence of polymethyl methacrylate (hereinafter, abbreviated as PMMA) may be insufficient in some specific fields.

Accordingly, there have been many suggestions recently for improvement of the hygroscopic property, enhancement of heat-resistance, lower birefringence and the like while retaining the optical properties of methacrylic resins. For example, for methacrylic resin less hydrophic, there have been suggested a copolymer composed of methyl methacrylate and cyclohexyl methacrylate (Japanese Patent Application Laid-Open (JP-A) No. 58-5318), and a copolymer composed of methyl methacrylate, cyclohexyl methacrylate and benzyl methacrylate (JP-A No. 58-13652). However, they have a demerit of lowered heat-resistance even though the low hygroscopic property is improved. Further, for imparting heat-resistance and low birefringence, there have been suggested a copolymer composed of methyl methacrylate and o-methylphenylmaleimide (JP-A No. 60-217216) and a copolymer composed of methyl methacrylate and a maleimide compound (JP-A No. 61-95011). However, also in these cases, the copolymers have such demerits that coloration is generally significant, due to introduced maleimide-based monomers.

On the other hand, there is a method in which heat-resistance is improved by suppressing molecular motion via use of a hard polymer chain. A polymer having a backbone pyran ring has been suggested as such polymer (U.S. Pat. No. 4,899,948 and Lon J. Mathias. Polymer. 35(15). 3317. 1994). However, this polymer is made of a methyl ester, isobonyl ester, trimethylcyclohexyl ester and the like, and has fairly high birefringence and can not be subjected to usual injection molding due to low mechanical strength. Further, the copolymer disclosed in this literature is a cross-linked polymer and a molded article thereof is not thermally melted and consequently melt molding is impossible. Also, a copolymer has been suggested which can be melt-molded owing to increased monomer purity (U.S. Pat. No. 5,247,035).

Further, a transparent thermoplastic resin having high ability is required in various fields including optical used and automobile use. Among others, materials of lenses for laser beam printers are required to have various properties further increased in order to obtain clear images. Particularly, low hygroscopic property, low birefringence and high heat-resistance are most important properties.

At present, glass and plastic materials are mainly used as lens materials. However, glass materials can not be recognized to have excellent mechanical strength, mass-productivity and cost performance.

Under such circumstance, a transparent thermoplastic resin, PMMA is frequently used as a lens material now in view of its strength and productivity. Though this PMMA has low birefringence, it has problems of high hygroscopic property and low heat-resistance. That is, because of size variation caused by water absorption, strain is formed in projecting a laser beam to a drum and quality of images tends to lower. Size variation is also caused by heat.

Since the beginning of the market for compact disks (CD) and laser disks (LD) at the beginning of 1980s, optical disks have been in steep increase. Recently, it has become desirable to record in digital mode dynamic images having a volume corresponding to LD in an optical disk in CD size, and a variety of thin disks having raised density are in development (lectures 17p-T-11 and 17p-T-13 in The Society of Applied Physics (Oyo butsuri Gakkai), lectures 29-a-B-8 and 29a-B-5 in The Society of Applied Physics, and the like).

Substrates of such optical disks are molded by an injection molding method which is inexpensive and capable of mass production, and PMMA and polycarbonate have been suggested as resin materials for substrates.

Regarding the plastic optical fiber (hereinafter, referred to as "POF"), PMMA is mainly used as a core material thereof since it has low transmission loss and mechanical properties and weather-resistance thereof present no problem. Upper limit temperature in use of an optical fiber containing PMMA as a core material is at most about 105° C. even when this fiber is endowed with coating excellent in weather-resistance, and heat-resistance thereof is insufficient for communication in movable bodies such as automobiles, electric cars, airplanes and the like and for outdoor use.

For improving heat-resistance of POF, there is a method in which a core material having high Tg is used. As the core material having high Tg, there are known 1) a material comprising a polycarbonate which itself exhibits high glass transition temperature (JP-A No. 61-262706), 2) a material comprising an olefin-based copolymer containing polycyclic olefin-based monomer (JP-A No. 61-211315), 3) a material comprising a methyl methacrylate/aromatic maleimide copolymer (Japanese Patent Application Publication (JP-B) Nos. 5-82405 and 5-82406), 4) a material comprising a methyl methacrylate/aliphatic maleimide copolymer (JP-A No. 63-80205), and 5) a material comprising a methyl methacrylate/alicyclic methacrylate copolymer (JP-A No. 61-260205).

For illuminating a meter panel mounted on a vehicle, airplane and the like, a light-inductive material made of an inorganic glass or transparent resin material is used. This light-inductive material carries a side face as a receptive surface, and a light emitted from a light source placed near the reception surface is introduced as an incident light into the light-inductive material and reflected on a reflection layer such as an aluminum deposited layer and the like provided on the rear surface of the light-inductive material, to illuminate indications situated on an emission surface on the light-inductive material.

It is usual for a light-inductive material for the light source to be placed directly near a reception surface so that a light having a quantity sufficient for illumination of an emission surface on the front side is allowed to pass through the reception surface having a small area, and it is necessary that the reception surface is not deformed or degraded by heat generated from the light source.

A light-inductive material made of an inorganic glass has a demerit of poor processability though it has excellent heat-resistance and transparency, therefore, recently light-inductive materials made of thermoplastic polymers are often used.

There are acrylic polymers, typified by PMMA, which are thermoplastic polymers having excellent transparency and weather-resistance. However, they have a demerit that light-inductive materials molded from these polymers tend to be deformed by heat generated in lighting of a lamp.

Polycarbonate resins generally have high impact-resistance and transparency, and sheets extrusion-molded are widely used in industrial fields such as a sound insulation walls, signboards and the like because of these physical properties. When a polycarbonate sheet is singly used, weather-resistance is poor. For improving this poor weather-resistance, there are known a method in which a film made of a methacrylic resin excellent in weather-resistance containing an ultraviolet absorber is laminated on the surface of a polycarbonate sheet and a method in which the surface of a polycarbonate sheet is treated by clear coating. In these methods, lamination methods are truly industrialized, but are difficult in cost reduction and improvement of productivity.

For realizing the reduction in cost and improvement of productivity, a co-extrusion method is known. By this method, a methacrylic resin can be directly laminated on a polycarbonate resin in a die of an extruder.

Methacrylic resins have demerits of low impact-resistance and heat-resistance. Therefore, many attempts have been made regarding improvement of impact-resistance, enhancement of heat-resistance and the like while retaining weather-resistance and optical properties of methacrylic resins.

Impact-resistance of a methacrylic resin can be improved by adding a reinforcing additive based on an elastomer material. In general, this additive is a polymer having multilayered particle structure, and at least one layer thereof is composed of an elastomer phase and refractive index thereof is controlled so that a transparent material may be obtained. However, when impact-resistance is increased, optical properties, flexural strength and heat-resistance are lowered.

As polymers having improved heat-resistance, random polymers are public-known such as a methyl methacrylate polymer chemically modified via imidation, a methyl methacrylate/α-methylstyrene/N-cyclohexylmaleimide copolymer, and the like. However, these polymers have low impact-resistance. Further, these polymers have high refractive index, therefore, for obtaining a transparent material having enhanced impact-resistance, only an additive having an elastomer phase based on a polybutadiene poor in weather-resistance can be used. Furthermore, in these cases, it is known that a yellowish color is exhibited when heat-melt-molding is effected due to introduction of an imide-based component. For solving this problem, an attempt has been made to suppress oxidative degradation by addition of an antioxidant, but the resulting effects were insufficient.

Further, as a thermoplastic polymer having relatively excellent transparency and high heat-resistance temperature, polycarbonates are envisaged. Since polycarbonates have a problem of poor weather resistance, there are known, for outdoor use thereof, a method in which an ultraviolet ray absorber is added to a polycarbonate and a method in which a film made of a methacrylic resin containing an ultraviolet ray absorber is laminated on the surface of a polycarbonate. However, these methods can not provide weather-resistance corresponding to that of PMMA. Namely, a heat-resistant resin having oxidation-degradation-resistance and weather-resistance corresponding to those of PMMA can not be obtained in current conditions.

Also, there has been an attempt for improving impact-resistance and heat-resistance simultaneously. This is related to a composition comprising a syndiotactic methyl methacrylate polymer and a reinforcing additive (JP-A No. 6-287398), however, a method for producing this polymer can not be easily industrialized and impact-resistance and heat-resistance of the composition are not sufficient.

Front surface of a head lamp and fog lamp of an automobile and a signal lamp is equipped with a lamp lens usually made of an inorganic glass for retaining light permeability. However, inorganic glasses have demerits of cracking tendency, heavy weight and the like though they are excellent in heat-resistance, transparency and weather-resistance. Accordingly, in some fields, a lamp lens made of a plastic has been developed and actually used.

Thermoplastic polymers excellent in transparency and weather-resistance include acrylic polymers represented by PMMA. However, lamp lenses molded from these polymers have a demerit of deformation tendency due to heat generated in lighting of a lamp. Further, as a thermoplastic polymer having relatively excellent transparency and weather-resistance and high heat-resistant temperature, polycarbonates are envisaged.

Light scattering sheet materials obtained by molding acrylic resins by adding a light scattering agent are used in illumination cover, signboard, display, glazing uses as well as other uses as materials for various molded articles having soft feeling unique to the materials. Recently, development of a high performance heat-sensitive material having both high light permeability and high light scattering property is desirable particularly in the illumination field.

In the past, various means have been used for imparting light scattering property, and among others, compositions into which organic fillers such as barium sulfate, calcium carbonate, silicon dioxide, talc, titanium dioxide, aluminum hydroxide and the like or power of resins having different refractive indices are compounded are exemplified.

However, a composition obtained by compounding an inorganic filler into an acrylic resin is not necessarily satisfactory in balance between high light permeability and high light scattering property, in addition, it is insufficient in heat-resistance. A sheet material disclosed in JP-B No. 3-2188 has insufficient heat-resistance though it is excellent in balance between high light permeability and high light scattering property. A glutaric anhydride copolymer disclosed in JP-A No. 49-85184 has no light scattering property thought it is excellent in heat-resistance and light permeability.

However, these prior arts have respective problems.

The polymer having low birefringence has defects that since the number-average molecular weight Mn of the polymer is low, it has significantly lowered mechanical strength and usual injection molding is difficult though improved heat-resistance and hygroscopic property are obtained. Further, since the ester group in this copolymer is a cycloalkyl group having 3 to 8 carbon atoms, it is necessary to increase pyran polymer content for enhancing heat-resistance thereof. Namely, also in this case, polymer strength decreases. That is, conventional polymers having low birefringence as described above are not fully satisfactory as optical disks, lenses and light transmission materials.

Accordingly, an object of the present invention is to provide a methacrylic molding material which is excellent in transparency, heat-resistance, low hygroscopic property and mechanical strength and has low birefringence.

Regarding lenses for laser beam printers, since polycarbonates have high birefringence, and even though they have excellent heat-resistance and hygroscopic property, they have a problem that when they are used as materials for lenses of laser beam printers, the projected light is dispersed. In general, birefringence is required to become lower with progress of improvement in ability of a lens, and it is not practical to improve heat-resistance and hydrophilic properties at the expense of birefringence.

Therefore, another object of the present invention is to provide a lens for a laser beam printer having excellent in balance in heat-resistance, hydrophilic properties and birefringence.

Regarding optical disk substrate and optical disks, PMMA has problems of low heat-resistance and is highly hydrophilic, though is has low birefringence. On the other hand, polycarbonates has a problem of high birefringence though they are excellent in heat-resistance and water absorption, and birefringence thereof should be lowered for responding to recent increased density of optical information.

Therefore, another object of the present invention is to provide an optical disk substrate and optical disk having good balance of birefringence, heat-resistance and hydrophilic properties.

Regarding plastic optical fibers, the materials of the above-described technologies 1) to 5) have a problem that light transmission loss thereof is higher by far as compared with POF containing MMA as a core material. Also, the materials of the above-described technologies 1) and 2) have a problem of large change with passing of time under high temperature.

Further, when use in movable bodies such as automobiles is taken into consideration, it is expected that bending parts increase since cables have to be arranged in restricted space. High light transmission loss of a fiber itself is disadvantageous since transmission loss increases by bending of the fiber in general, and improvement of heat-resistance at the expense of transmission loss as described in the above-described technologies 1) to 5) can not be admitted to be satisfactory.

Therefore, another object of the present invention is to provide POF having remarkably improved heat-resistance and revealing smaller increase in transmission loss as compared with PMMA.

Further, regarding light-inductive materials, there are problems that polycarbonates can not be recognized to have sufficient heat-resistance though they have excellent transparency and high heat-sensitive temperature, therefore, the light-inductive materials have to be made into forms which do not reach such a high temperature, or special means should be provided to prevent over heating, and the like. Polycarbonate also have a problem regarding weather-resistance.

Therefore, another object of the present invention is to provide a light-inductive material excellent in transparency, weather-resistance and heat-resistance.

Further, regarding modified polycarbonate sheets and production thereof, setting of resin temperature in an extruder is difficult since the glass transition temperature (Tg) of a methacrylic resin is lower by about 50° C. as compared with that of a polycarbonate resin and the optimal melting temperatures of both resins have a difference of about 50° C. in this method. Further, suitable roll temperatures of both resins have a difference of 30 to 50° C., therefore, when the roll temperature is set for a polycarbonate resin, a methacrylic resin is decomposed or has deteriorated releasing property from a roll leading to generation of scar on the surface of a sheet due to releasing failure. On the other hand, when the roll temperature is set for a methacrylic resin, there occurs a problem of generation of warping in a polycarbonate.

Therefore, another object of the present invention is to provide a modified polycarbonate sheet having improved weather-resistance in high productivity and low cost.

Further, regarding a resin composition, an object of the present invention is to provide a resin composition which has no defects as described above in optical properties and weather-resistance and has excellent impact-resistance and heat-resistance. Another object of the present invention is to provide a thermoplastic resin composition which has excellent heat-resistance, has weather-resistance corresponding to that of polymethyl methacrylate, and has excellent oxidation-degradation-resistance.

Also, regarding lamp lenses, polycarbonates have a problem of relatively higher specific gravity among plastics. Further, polycarbonates can not be recognized to have sufficient heat-resistance, therefore, specific forms have to be made so that lenses do not reach such a high temperature, or special means should be provided to prevent over heating, in practical application. Namely, there has been known no lamp lens composed of a thermoplastic polymer which has excellent transparency and weather-resistance, low specific weight, and high heat-resistant temperature.

Further, regarding a sheet molded material having light scattering property, an object of the present invention is to provide a molded article which has extremely excellent total light permeability and light scattering property and has excellent heat-resistance.

DISCLOSURE OF THE INVENTION

The gist of the present invention resides in a copolymer having low birefringnce substantially consisting of a repeating unit represented by the general formula (1) and a repeating unit of a (meth)acrylate:

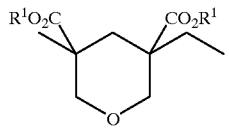

(1)

(wherein, $R^1$ represents a hydrogen atom or a hydrocarbon group having 1 to 25 carbon atoms, an alicyclic hydrocarbon group or a substituted hydrocarbon group.).

Another gist of the present invention resides in a method for producing a copolymer having low birefringence in which an α-substituted acrylate monomer represented by the general formula (2) and a (meth)acrylate are copolymerized using as a polymerization initiator a peroxide having two or more O—O bonds in one molecule:

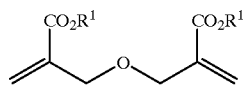

(2)

(wherein, $R^1$ represents a hydrogen atom or a hydrocarbon group having 1 to 25 carbon atoms, an alicyclic hydrocarbon group or a substituted hydrocarbon group.).

Another gist of the present invention resides in a polymer having low birefringence substantially consisting of a repeating unit represented by the general formula (1) and having a birefringence R measured in a molded article having a thickness of 2 mm of 80 nm or less.

Another gist of the present invention resides in a method for producing a polymer having low birefringence in which an α-substituted acrylic is polymerized using as a polymerization initiator a peroxide having two or more O—O bonds in one molecule.

Another gist of the present invention resides in a pickup lens molded from the above-described copolymer having low birefringence or the above-described polymer having low birefringence.

Another gist of the present invention resides in a lens for a laser beam printer molded from a polymer containing a repeating unit represented by the general formula (1).

Another gist of the present invention resides in an optical disk substrate constituted of a polymer containing a repeating unit represented by the general formula (1).

Another gist of the present invention resides in an optical disk comprising the above-described optical disk substrate carrying thereon an inorganic thin film laminated.

Another gist of the present invention resides in a plastic optical fiber having core-clad structure in which the core is substantially constituted of a polymer containing a repeating unit represented by the general formula (1).

Another gist of the present invention resides in a light-inductive material molded from a polymer containing a repeating unit represented by the general formula (1).

Another gist of the present invention resides in a modified polycarbonate sheet in which a polymer containing a repeating unit represented by the general formula (1) is laminated on one surface or both surfaces of a polycarbonate resin sheet, and further, another gist of the present invention resides in a method for producing a modified polycarbonate sheet in which a polycarbonate resin and a polymer containing a repeating unit represented by the general formula (1) are co-extruded.

Another gist of the present invention resides in a resin composition prepared by mixing a reinforcing additive composed of multilayered particle structure in which at least one layer thereof is made of an acrylic elastomer into a polymer containing a repeating unit represented by the general formula (1).

Another gist of the present invention resides in a resin composition prepared by mixing 0.01 to 10 parts by weight of an ultraviolet ray absorber or antioxidant into 100 parts by weight of a polymer containing a repeating unit represented by the general formula (1).

Another gist of the present invention resides in a lamp lens molded from a polymer containing a repeating unit represented by the general formula (1).

Another gist of the present invention resides in a light scattering sheet molded article prepared by inclusion of fine particles into a polymer containing a repeating unit represented by the general formula (1).

BEST MODE FOR CARRYING OUT THE INVENTION

Figure 1:
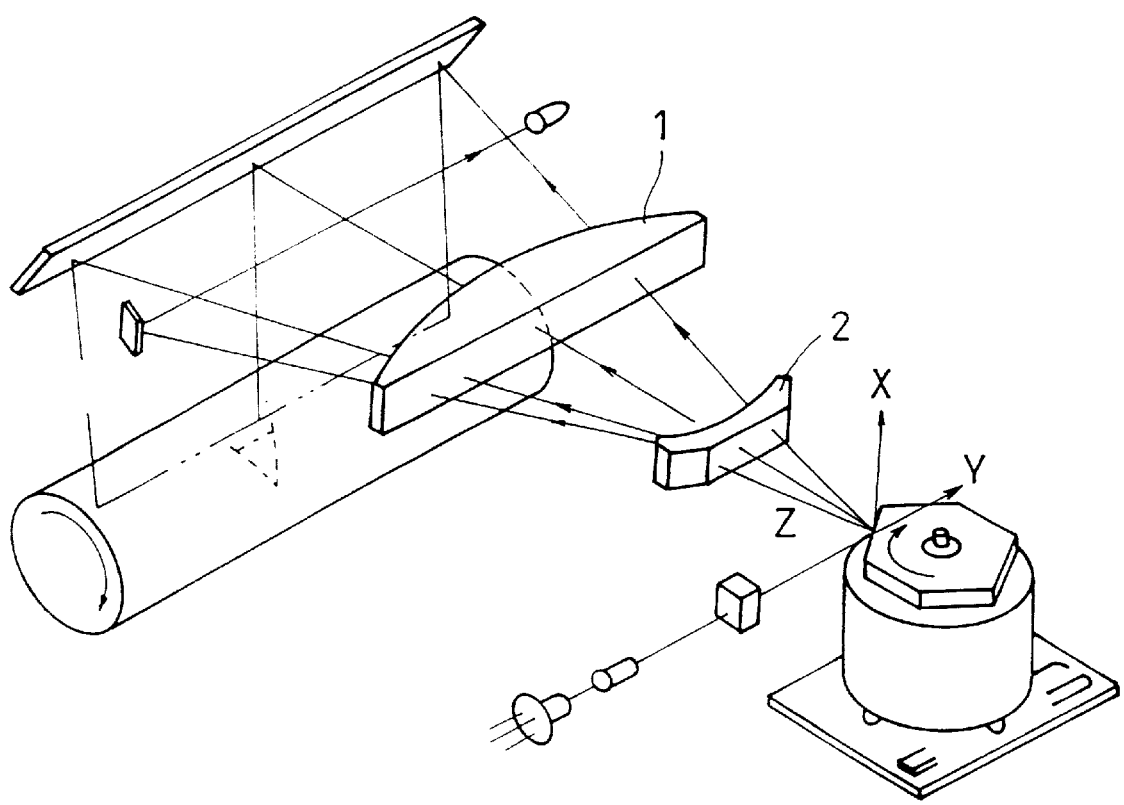
FIG. 1 is a view showing optical system of a laser beam printed.

The copolymer having low birefringence of the present invention substantially consists of a repeating unit represented by the general formula (1) and a repeating unit of a (meth)acrylate, and the polymer consisting of a repeating unit represented by the general formula (1) shows a positive birefringence value while the (meth)acrylate polymer shows a negative birefringence value. Namely, a copolymer having a birefringence of 0 or near 0 is obtained by copolymerization of an α-substituted acrylate represented by the general formula (2) which the polymer thereof has a positive birefringence value and a (meth)acrylate which the polymer thereof has a negative birefringence value. A monomer of the general formula (2) causes cyclization reaction in polymerization, to form a pyran ring (actually, tetrahydropyran ring) structure.

Specific examples of the monomer of the general formula (2) include dimethyl-2,2'-[oxybis(methylene)]bis-2-propenoate, diethyl-2,2'-[oxybis(methylene)]bis-2-propenoate, di(n-propyl)-2,2'-[oxybis(methylene)]bis-2-propenoate, di(isopropyl)-2,2'-[oxybis(methylene)]bis-2-propenoate, di(n-butyl)-2,2'-[oxybis(methylene)]bis-2-propenoate, di(isobutyl)-2,2'-[oxybis(methylene)]bis-2-propenoate, di(t-butyl)-2,2'-[oxybis(methylene)]bis-2-propenoate, distearyl-2,2'-[oxybis(methylene)]bis-2-propenoate, dilauryl-2,2'-[oxybis(methylene)]bis-2-propenoate, di(2-ethylhexyl)-2,2'-[oxybis(methylene)]bis-2-propenoate, di(methoxyethyl)-2,2'-[oxybis(methylene)]bis-2-propenoate, dibenzyl-2,2'-[oxybis(methylene)]bis-2-propenoate, diphenyl-2,2'-[oxybis(methylene)]bis-2- propenoate, dicyclohexyl-2,2'-[oxybis(methylene)]bis-2-propenoate, di(4-t-butylcyclohexyl)-2,2'-[oxybis(methylene)]bis-2-propenoate, di(dicyclopentadienyl)-2,2'-[oxybis(methylene)]bis-2-propenoate, di(tricyclodecanyl)-2,2'-[oxybis(methylene)]bis-2-propenoate, diadamantyl-2,2'-[oxybis(methylene)]bis-2-propenoate and the like. Among others, particularly preferable are monomers represented by the general formula (2) in which $R^1$ has two or more carbon atoms, and dibenzyl-2,2'-[oxybis(methylene)]bis-2-propenoate, dicyclohexyl-2,2'-[oxybis(methylene)]bis-2-propenoate, di(4-t-butylcyclohexyl)-2,2'-[oxybis(methylene)]bis-2-propenoate, di(tricyclodecanyl)-2,2'-[oxybis(methylene)]bis-2-propenoate and diadamantyl-2,2'-[oxybis(methylene)]bis-2-propenoate are specifically listed. These monomers can be used in combination of two or more.

Examples of the copolymer component, (meth)acrylate include methacrylates such as methyl methacrylate, ethyl methacrylate, n-propyl methacrylate, isopropyl methacrylate, n-butyl methacrylate, isobutyl methacrylate, t-butyl methacrylate, isoamyl methacrylate, lauryl methacrylate, phenyl methacrylate, benzyl methacrylate, cyclohexyl methacrylate, glycidyl methacrylate and 2-ethylhexyl methacrylate, and acrylates such as methyl acrylate, ethyl acrylate, n-propyl acrylate, isopropyl acrylate, n-butyl acrylate, isobutyl acrylate, t-butyl acrylate, isoamyl acrylate, lauryl acrylate, phenyl acrylate, benzyl acrylate, cyclohexyl acrylate, glycidyl acrylate and 2-ethylhexyl acrylate. Among others, methyl methacrylate, ethyl methacrylate, benzyl methacrylate, cyclohexyl methacrylate and methyl acrylate are preferable. (Meth)acrylate monomers can also be used in combination of two or more.

This copolymer having low birefringence can be produced by a known polymerization method such as radical polymerization, anion polymerization, group transfer polymerization (GTP), coordinated anion polymerization and the like.

When a radical polymerization method is used, polymerization is conducted preferably using a polymerization initiator having two or more O—O bonds in one molecule. When polymerization is conducted using this polymerization initiator, a polymer having high degree of polymerization can be obtained in relatively short polymerization of time at higher yield. The amount used of this polymerization initiator may be approximately the same amount as that of a usual initiator, and generally from 0.1 to 1% by weight based on the monomer. As specific examples of the polymerization initiator having two or more O—O bonds in one molecule, for example, there are listed Pertetra A, Perhexa MC and Peromer AC (all trade names) manufactured by NOF Corp.

As the solvent used in polymerization, hydrocarbons such as toluene, xylene, benzene and hexane, halogenated hydrocarbons such as chloroform, methylene chloride and carbon tetrachloride, and teterahydrofuran, dimethylformamide, dimethylsulfoxide, diethyl ethers and the like.

The concentration of a monomer in polymerization is not particularly restricted and preferably from 4 to 30% by weight and more preferably from 4 to 25% by weight. When monomer concentration is too low, yield of a polymer lowers, and when monomer concentration is too high, because of preferential progress of intermolecular polymerization, intended structure is not partially formed and melt-molding of the produced polymer becomes impossible.

The formulation ratio of a repeating unit represented by the general formula (1) to a repeating unit of a (meth) acrylate in the copolymer having low birefringence of the present invention is not particularly restricted, and the amount of the (meth)acrylate is preferably in the range from 30 to 99% by weight, more preferably in the range from 40 to 85% by weight in view of property as an optical material.

Further, the present invention provides a polymer having low birefringence substantially consisting of a repeating unit represented by the general formula (1) and having a birefringence R measured in a molded article having a thickness of 2 mm of 80 nm or less. The polymer consisting of a repeating unit represented by the general formula (1) exhibits a positive birefringence which is near 0, therefore, it is excellent in transparency, heat-resistance and low water absorbability. Consequently, this polymer is suitable to be used as a material of an optical disk, lens and light transmission material.

This polymer having low birefringence can be produced by polymerizing a monomer represented by the general formula (2) according to the same method as in the above-described copolymer having low birefringence. When polymerization is conducted using a polymerization initiator having two or more O—O bonds in one molecule, a polymer having high degree of polymerization can also be obtained in relatively short polymerization of time in high yield.

Both of the copolymer having low birefringence and the polymer having low birefringence of the present invention (hereinafter, referred to as "low birefringent (co)polymer") preferably has a birefringence R measured in a molded article having a thickness of 2 mm of 80 nm or less, more preferably 40 nm or less. The molecular weight of this low birefringent (co)polymer is not particularly restricted, and preferably in the range from 10,000 to 1,000,000 in terms of number-average molecular weight Mn. It is more preferably in the range from 50,000 to 1,000,000, and most preferably from 50,000 to 500,000. When the molecular weight is 50,000 or less, the mechanical strength of the (co)polymer decreases and injection molding is difficult, however, molding by a press molding method and a solution molding method is possible.

When a molded article is produced using the (co)polymer of the present invention, a known melt molding method, a solution molding method and the like can be used. When a plate molded article is produced, it is also possible to adopt a cast molding method in which a monomer is injected between glass plates and is polymerized. Further, the (co)polymer of the present invention can be combined with a suitable amount of a reinforcing agent, plasticizer, cross-linking agent, heat stabilizing agent, coloring agent, ultraviolet ray absorber, antioxidant and releasing agent to produce a molded article. Particularly, a reinforcing agent which improves impact strength, an ultraviolet ray absorber and an antioxidant which improve weather resistance and antioxidative property are preferably added.

A molded article of a polymer containing a repeating unit represented by the general formula (1) (hereinafter, referred to as "pyran ring-containing polymer") has excellent transparency, heat-resistance and low hydrophilia, and can be used as a light-inductive material or heat-resistant acrylic plate. Further, it can manifest sufficient abilities as a lens, disk and light transmission material due to its low birefringence. Moreover, it can also be used as a surface coating agent due to its excellent weather resistance. Namely, examples of its use include lens materials such as a pickup lens, fθ lens for a laser beam printer, spectacle lens, camera lens, videocamera lens and lamp lens, disk materials such as a video disk, audio disk and unrewritable disk for a computer, light transmission materials such as an optical fiber, optical connector and light-inductive material, display materials such as a signboard, tank, light scattering plate and the like, polycarbonate surface coat, polycarbonate laminated sheet, and the like. Among others, a pickup lens, fθ lens for a laser beam printer, core material of an optical fiber and optical disk, light-inductive plate, polycarbonate laminated sheets, lamp lens and light scattering molded article are particularly suitable subjects.

When a pyran ring-containing polymer is used for these uses, $R^1$ in the repeating unit represented by the general formula (1) is preferably a methyl, ethyl or group having 6 or more carbon atoms in view of specific gravity and heat-resistance, and particularly preferably methyl, cyclohexyl, t-butylcyclohexyl, tricyclodecanyl or adamantyl.

As other components than the repeating unit represented by the general formula (1) in this pyran ring-containing polymer, (meth)acrylates such as methyl methacrylate, methyl acrylate, styrene, α-methylstyrene, acrylonitrile, fluorinated methacrylate and the like are exemplified, and methyl methacrylate is most preferably in view of transparency.

Methyl methacrylate or (meth)acrylates having the same ester group as the repeating unit represented by the general formula (1) or a mixture thereof is particularly preferable in view of strength, like in the case of a composition containing a reinforcing agent which improves impact resistance, a ultraviolet ray absorber and an antioxidant which improves weather resistance and antioxidative property, or the case of a light scattering sheet molded article.

The content of the repeating unit represented by the general formula (1) in the pyran ring-containing polymer is not particularly restricted, and in the case of a light-inductive material and a lamp lens, the content of the repeating unit represented by the general formula (1) is preferably 30% by weight or more, more preferably 50% by weight or more in view of property as a material thereof. Further, in the case of use as an optical disk and a core material of optical fiber, the content of the repeating unit represented by the general formula (1) is preferably 20% by weight or more, more preferably 40% by weight or more. Further, in the case of use as a lens for a laser beam printer and a PC laminated sheet, the content of the repeating unit represented by the general formula (1) is preferably 20% by weight or more, more preferably 30% by weight or more. Further, in the case of use in a composition containing a reinforcing additive which improves impact resistance, a ultraviolet absorber and an antioxidant which improve weather resistance and antioxidative property, the content of the repeating unit represented by the general formula (1) is preferably 10 to 90% by weight, more preferably 20 to 80% by weight in view of requirement of heat-resistance and strength thereof. Further, in the case of use as a light scattering sheet molded article, the content of the repeating unit represented by the general formula (1) is preferably 10% by weight or more, more preferably 20% by weight or more in view of requirement of heat-resistance. In any case, when the content is too low, heat-resistance tends to be too low, and when is too high, strength tends to decrease.

When it is used as a lens for a laser beam printer, the birefringence of the pyran ring-containing polymer is preferably $60 \times 10^{-6}$ or less, more preferably $40 \times 10^{-6}$ or less. When the birefringence is too high, use in a high performance laser beam printed is restricted.

The lens for a laser beam printer of the present invention can be molded by an injection molding method, injection compression molding method or the like.

The lens for a laser beam printer is used for reception of laser beams scattering on YZ plane by drum surface without distortion and includes both of a toric lens 1 and a curve lens 2, and at least one of the incident surface and emitting surface thereof is to have curve form.

The thickness of the optical disk substrate of the present invention is preferably 1.2 mm or less, more preferably 1.0 mm or less. As described in formula (4) in "Optical Technology Contact (Kogaku Gijutsu Kontakuto)" 23, No. 7, (1985), p. 451, coma aberration having dimension in proportion to cube of numerical aperture and plate thickness occurs on a declined optical disk molding plate. Therefore, in the case of large thickness, when an object glass having large numerical aperture is used for high density of an optical disk, coma aberration increases, as a result, when the disk substrate declines, crosstalk increases and at the same time return light quantity from the disk reduced, leading undesirably to deterioration of S/N ratio and increase of jitter.

Further, in the present invention, the birefringence of an optical disk substrate is preferably $70 \times 10^{-6}$ or less, more preferably $40 \times 10^{-6}$ or less by double pass. Too high birefringence is not preferable since then data error factor of a reading signal increases and tracking becomes unstable. The birefringence is a value obtained by dividing a measured value of a beam having a wavelength of 546 nm by double pass by the thickness of a sample such as a lens, disk substrate and the like, and unit thereof is dimensionless.

The optical disk substrate of the present invention can be molded by an injection molding method, injection compression molding method and the like. As the injection conditions such as cylinder temperature, mold temperature, locking pressure, injection rate and the like, conditions suitable for a resin composition are selected.

An optical disk can be obtained by laminating an inorganic thin film on this optical disk substrate. As this inorganic thin film, a single metal substance such as aluminum, gold and the like, or a metal material essentially containing them, and an inorganic dielectric substance such as silicon oxide, silicon nitride, zirconium oxide and the like are used. The kind, thickness and composition of the inorganic thin film herein formed are determined depending on the kind of an optical disk. For example, in a usual play back-dedicated optical disk, an aluminum film is formed having a thickness of 50 nm or more for obtaining sufficient reflection and durability. In an unrewritable optical disk and rewritable optical disk, it is normal to laminate a dielectric substance and a metal material.

The clad material of the optical fiber (POF) of the present invention is not particularly restricted providing it has lower refractive index than that of a core material, and there can be used a fluorinated methacrylate-based polymer, fluorinated methacrylate/methacrylate copolymer, fluorinated vinylidene/tetrafluoroethylene copolymer, α-fluoromethacrylate-based resins and the like, or a mixture thereof.

When the thickness of the clad part is too small, leaking light can not be ignored and transmission loss in the whole POF increases, therefore the thickness is preferably 1 μm or more.

The POF having core/clad structure of the present invention can be produced by a complex spinning method in which core and clad polymers are melted respectively and extruded through a complex nozzle, or by a coating method in which a solution of a clad polymer is applied on a core polymer shaped into fiber form, then the solvent is removed.

It is also possible to coat peripheral part of a clad layer with a protective layer for the purpose of improving heat-resistance, moisture-resistance, chemical-resistance and the like. As the protective layer, known polymers can be used such as a tetrafluoroethylene/fluorinated vinylidene copolymer and the like, and structure of core/clad/protective layer can be formed by a complex spinning method and the like.

These fibers having core/clad structure or core/clad/protective layer can also be used as an optical fiber cable coated with a jacket material such as vinyl chloride and the like.

Figure 2:
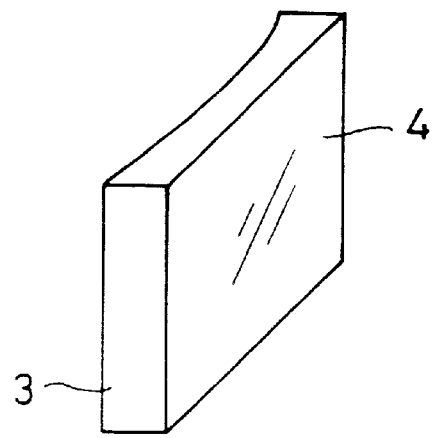
FIG. 2 is a perspective view of a light-inductive material of the present invention.
Figure 3:
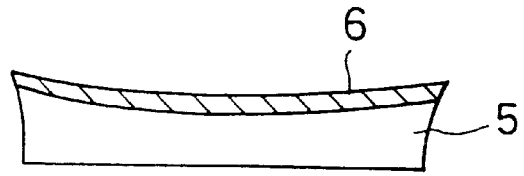
FIGS. 3 and 4 are sectional views of a light-inductive material of the present invention.

The light-inductive material of the present invention has at least an emission surface and reception surface, the form thereof is not restricted, and any form can be adopted depending on intended use and design. FIG. 2 is a perspective view showing one example of the light-inductive material of the present invention, and usual form thereof is plate form, and one or two side faces of the plate form material are used as reception surfaces 3, while other surface is used as an emission surface 4. A light source is usually placed facing the reception surface. If necessary, a reflection material 6 and the like can be placed as shown in FIG. 3 on the opposite face of a light-inductive material 5 to the reception surface.

The light-inductive material of the present invention can be molded by a known melt molding method, solution molding method and the like. Of these molding methods, an injection molding method is most preferable because of excellent efficiency.

Figure 4:
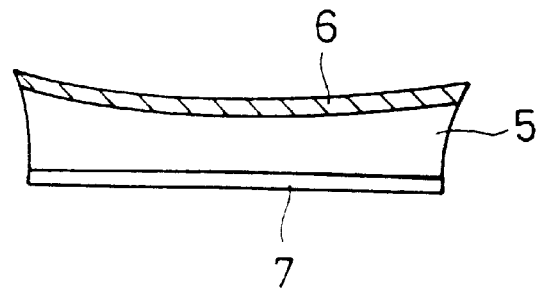

On the light-inductive material, a cured coat 7 made of a cross-linking curing resin can be formed, if necessary, on the emission surface as shown in FIG. 4 since scratch resistance on the surface may sometimes be required. As compounds for forming such as cross-linking curing resin, acrylic poly-functional compounds, silicon-based compounds and the like are listed.

In the pyran ring-containing polymer used in the modified polycarbonate sheet of the present invention, an ultraviolet ray absorber is preferably mixed for use outdoors though this pyran ring-containing polymer itself has excellent weather-resistance. Further, it is also possible to add an antioxidant, lubricant, coloring agent, pigment and the like depending on purposes.

The thickness of the pyran ring-containing polymer laminated on a polycarbonate resin sheet can be set corresponding to the object, and it is preferable that the thickness of the pyran ring-containing polymer is thinner than that of the polycarbonate resin sheet for retaining high impact-resistance of the polycarbonate resin sheet.

The modified polycarbonate sheet of the present invention can be made to have two-layer structure of pyran ring-containing polymer-polycarbonate resin, or three-layer structure of pyran ring-containing polymer-polycarbonate resin- pyran ring-containing polymer, depending on intended use.

The modified polycarbonate sheet of the present invention has excellent weather resistance, scratch resistance and chemical resistance as compared with a single polycarbonate resin sheet similar to the sheet obtained by conventional methacrylic resin film lamination method. Moreover, a co-extrusion method has simpler production process than a conventional lamination method and enables significant increase in productivity. The co-extrusion used in producing this modified polycarbonate sheet can adopt the same conditions as in a conventional extrusion method of a polycarbonate sheet.

The resin composition of the present invention is prepared by adding to a pyran ring-containing polymer a reinforcing compounding agent having multilayered structure in which at least one layer thereof is composed of an acrylic elastomer. In this reinforcing additive, provided that at least one layer is constituted of an acrylic elastomer, any polymer can be used in other layer. For example, there can be used a polymer having two-layer structure in which the inner layer is made based on an elastomer essentially containing a polyalkyl acrylate such as polybutyl acrylate and the like or an elastomer containing an organosiloxane and polyacrylate entangling with each other, and the outer layer is made of a hard polymer such as methyl methacrylate. Alternatively, there can also be used a polymer having three-layer structure in which the inner layer is made of a hard polymer such as methyl methacrylate, the intermediate layer is made of an elastomer essentially containing a polyalkyl acrylate such as polybutyl acrylate or an elastomer containing an organosiloxane and polyacrylate entangling with each other, and the outer layer is made of a hard polymer such as methyl methacrylate. Among others, the polymer having two-layer structure in which the inner layer is made of an elastomer containing an organosiloxane and polyacrylate entangling with each other is preferable due to good balance between heat-resistance and impact-resistance.

In the resin composition of the present invention, a reinforcing additive having multilayered particle structure can be mixed into a pyran ring-containing polymer in any formulation. However, a composition in which 60 to 1% by weight of a reinforcing additive is added to 40 to 99% by weight of a pyran ring-containing polymer is preferable and a composition in which 40 to 5% by weight of a reinforcing additive is added to 60 to 95% by weight of a pyran ring-containing polymer is more preferable in view of balance between heat-resistance and impact-resistance.

When the resin composition of the present invention is produced, a known melt blending method, solution blending method and the like can be used. Of these blending methods, a method in which melt-extrusion is conducted after powder blending is preferred in view of efficiency. The resulted composition can be applied to molded articles obtained by a sheet extrusion method, injection molding method or other molding method, and products thereof will exhibit excellent impact-resistance and heat-resistance.

Another resin composition of the present invention is prepared by adding an ultraviolet ray absorber or an antioxidant into a pyran ring-containing polymer.

The ultraviolet ray absorber used in the present invention includes benzophenone-based compounds, salicycate-based compounds, benzoate-based compounds and triazole-based compounds. As the benzophenone-based compound, for example, 2,4-di-hydroxybenzophenone, 4-n-octyloxy-2-hydroxybenzophenone and the like are listed. As the salicycate-based compound, p-t-butylphenyl salicycate and the like are listed. As the benzoate-based compound, 2,4-di-t-butylphenyl-3',5'-di-t-butyl-4'-hydroxybenzoate and the like are listed. Further, as the triazole-based compound, 2-(5-methyl-2-hydroxyphenyl) benzotriazole and 2-[2-hydroxy-3,5-bis($\alpha,\alpha$-dimethylbenzyl)phenyl]-2H-benzotriazole are listed. Among others, triazole-based compounds are preferable. These can be used alone or in combination of two or more species.

The amount of an ultraviolet ray absorber is from 0.01 to 10 parts by weight, and preferably from 0.05 to 3 parts by weight based on 100 parts by weight of a pyran ring-containing polymer. When the amount is less than 0.01 part by weight, contribution of the ultraviolet ray absorber to improvement of weather-resistance is undesirably low, and when over 10 parts by weight, mechanical strength of the resin composition undesirably decreases.

As the antioxidant used in the present invention, phosphite-based compounds, hindered phenol-based compounds and the like are listed. For example, as the phosphite-based compound, bisnonylphenylpentaerythrithol diphosphite (Mark PEP-4C, trade name, Adeka Agus Corp.), bisoctadecanylpentaerythrithol diphosphite (Mark PEP-8, trade name, Adeka Agus Corp.), bistridecanylpentaerythrithol diphosphite (Mark PEP-13, trade name, Adeka Agus Corp.) and the like are listed. As the hindered phenol-based compound, pentaerythrityltetrakis [3-(3,5-di-t-butyl-4-hydroxyphenyl) propionate](IRGANOX 1010, trade name, manufactured by Nippon Ciba Geigy K.K.), triethylene glycol bis[3-(3-t-butyl-5-methyl-4-hydroxyphenyl) propionate] and the like. Among others, phosphite-based compounds are preferable. These can be used alone or in combination of two or more species.

The amount of an antioxidant is from 0.01 to 10 parts by weight based on 100 parts by weight of a pyran ring-containing polymer. When the amount compounded is less than 0.01 part by weight, sufficient oxidation-degradation-resistance can not be manifested undesirably, and when over 10 parts by weight, mechanical strength of the resin composition undesirably decreases.

A method for adding an ultraviolet ray absorber and antioxidant is not particularly restricted, and a method in which they are added to a polymer in an extruder is preferable.

Into the resin composition of the present invention, a reinforcing additive, antioxidant and ultraviolet ray absorber can be added together depending on purposes. Also, other lubricant, fibrous reinforcing agent, coloring agent, pigment and the like can be added.

The lamp lens of the present invention can be produced by a known melt molding method, solution molding method and the like. Of these molding methods, an injection molding method is most preferable because of excellent efficiency. In molding, a suitable amount of plasticizer, crosslinking agent, heat stabilizing agent, coloring agent, ultraviolet ray absorber, releasing agent and the like can be added.

Figure 5:
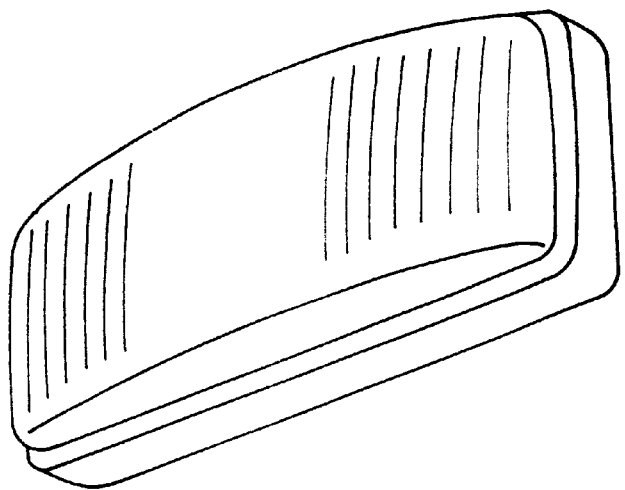
FIG. 5 is a perspective view of a lamp lens for an automobile.
Figure 6:
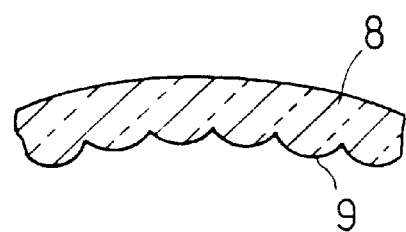
FIG. 6 is an enlarged sectional view of the lens part of FIG. 5.
Figure 7:
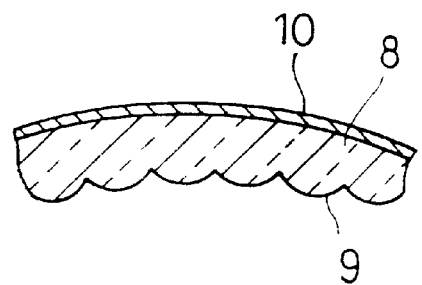
FIG. 7 is an enlarged sectional view of the lens part of a lamp lens having a cured coat formed on the outer surface thereof.

FIG. 5 exemplifies typical form of the lamp lens (to be mounted on an automobile) of the present invention, and FIGS. 6 and 7 show enlarged sectional views of main parts. This can be shaped into any form depending on intended use as a head lamp, fog lamp and signal lamp and design thereof. For obtaining sufficient illumination effect, structure in which a group of lenses 9 is placed on light permeating surface (inner surface) on lamp side is preferably adopted.

It is necessary for the lamp lens of the present invention to allow an inner lamp light to permeate efficiently, and for this purpose, it is preferable that YI value measured by a color difference meter is 3 or less, and the total optical transmittance measured by an integrating sphere haze meter is 87% or more. Since scratch resistance is required for the surface, it is preferable to form a cured coat 10 made of a crosslinking curing resin at least on the outer surface of a substrate 8 if necessary, as shown in FIG. 7. As the crosslinking curing resin, those made of acrylic polyfunctional compounds, silicon-based compounds and the like are listed.

The light scattering sheet molded article of the present invention can be shaped into any form such as plate, film, bowl and polyhedron forms and the like. In the case of an illumination lamp, it is preferable to adopt structure covering completely beams from a lamp. A plate form molded article is most preferable in view of productivity.

The fine particle used in the light scattering sheet molded article of the present invention has action for scattering a light to mask the image of a light source. Since the scattering occurs by difference in refractive indices of the fine particle and polymer, the difference is preferably 0.03 or more. When the difference in refractive indices is less than 0.03, masking tends to become insufficient. The difference in refractive indices is preferably 1.5 or less, more preferably 1.0 or less in view of light permeability of the molded article.

It is preferable that the fine particle itself is colorless in view of flexibility in use. The particle size of the fine particle is preferably from 0.5 to 20 $\mu$m, more preferably from 1 to 10 $\mu$m in view of masking property and uniformity. The content of the fine particle varies depending on difference in refractive index and particle size, and is preferably from 0.1 to 5 parts by weight, more preferably from 0.5 to 3 parts by weight based on 100 parts by weight of the polymer in view of masking property and light permeability.

The material of the fine particle used in the present invention is not particularly restricted and preferably one having the above-described properties together. Examples of the inorganic material include, but are not limited to, aluminum oxide, calcium carbonate, calcium silicate, calcium aluminate, calcium sulfate, basic calcium carbonate, barium sulfate, titanium dioxide, talc, clay, feldspar, white earth, kaolin, celite, glass, magnesium hydroxide, aluminum hydroxide, silica and the like. Among others, preferable are calcium carbonate, magnesium hydroxide, aluminum hydroxide and silica.

Examples of the organic material include crosslinked polystyrene, crosslinked polymethyl methacrylate, crosslinked methyl methacrylate/styrene copolymer, polymethylsilsesquioxane, silicone resin and the like. Among others, crosslinked polymethyl methacrylate and crosslinked methyl methacrylate/styrene copolymer are preferable due to easy availability. These inorganic materials and organic materials may also be used in combination.

In producing the sheet molded article of the present invention, first procedure required is blend of a pyran ring-containing polymer with fine particles, and there are listed known blending methods, for example, a method using a Henschel mixer, a method using a V-shaped blender, and the like. Of the molding methods, methods in which melt-extrusion is conducted after powder blending or further injection molding is conducted are preferable due to excellent efficiency.

The sheet molded material of the present invention is itself excellent in light-resistance, however, it is preferable to use a stabilizer such as an ultraviolet ray absorber when the molded material is used for use such a illumination lamp cover, in particular, a mercury lamp cover and the like in which the molded article receives a strong beam such as an ultraviolet ray under high temperature. Further, it is also possible to add a reinforcing additive, antioxidant, other lubricant, fibrous reinforcing agent, coloring agent, pigment and the like into the sheet molded article of the present invention depending on the objects.

The following examples further illustrate the present invention specifically. Polymers and molded article thereof obtained in the examples are evaluated as follows. Parts are by weight.

1) Molecular Weight, Molecular Weight Distribution

They were given by a GPC method (solvent: chloroform) using PMMA as a standard.

2) Composition of Polymer

It is quantified by $^1$H NMR (solvent: chloroform-d, measuring temperature: 60° C.).

3) Saturated Water Absorption

A pellet was dried for 24 hours at 80° C., and injection-molded at a cylinder temperature of 250° C. and a mold temperature of 60° C., to obtain a 50×100×2 mm flat sample plate. This is dried at 80° C., then, the weight thereof was measured, then immersed in warm water of 25° C. until it reached equilibrium. The weight after equilibrium was measured and the saturate water absorption was calculated according to the following formula.

Saturated water absorption (%)=[(weight after water absorption−dried weight)/dried weight]×100

4) Total Optical Transmittance

It was measured according to ASTM D1003 using a flat plate having a thickness of 2 mm.

5) Birefringence R

A flat plate having an overall length of 100 mm, a width of 5 cm and a thickness of 2 mm was injection-molded at a cylinder temperature of 240° C., a mold temperature of 70° C. and an injection pressure of 800 to 850 kg/cm$^2$, and optical path difference R (retardation) was measured at three positions distant from a gage by 5 cm by a polarization microscope.

6) Vicat Softening Temperature

It was measured according to ASTM D1525 using a flat plate having a thickness of 3 mm.

7) Flexural Strength and Flexural Modulus

They were measured according to ASTM D790.

8) Weather Resistance

A sample was exposed for 500, 1000 and 1500 hours at a cycle of water 12 minutes/drying 60 minutes at a black panel temperature of 63° C. using Sunshine Weather-O-meter (WE-SUN-DC, manufactured by Suga Shikenki K.K.). This sample was observed regarding the following appearance items.

Abnormal changes in appearances such as cracking, crazing, delamination, haze, yellowing and the like were inspected, ○ is given when there is no abnormal change, and x is given when an abnormal change is recognized 9) Birefringence It was measured using a beam having a wavelength of 546 nm by double pass using a polarization microscope. Birefringence is a value obtained by dividing the measured value by thickness.

10) Glass Transition Temperature (Tg)

It was measured by DSC.

11) Yellowing Index (YI Value)

It was measured according to JIS K-7103 using a color difference meter analyzer (307 type, manufactured by Hitachi Ltd.). YI value was calculated according to the following formula using X, Y and Z stimulation values.

YI value=100(1.28X−1.06Z)/Y

12) Abrasion Resistance (Steel Wool Scratch-Resistance)

000 steel wool ("BONSTAR" manufactured by Nippon Steal Wool) was attached to a circular pad having a diameter of 25 mm, and this pad was place on the surface of a sample held on a reciprocation type abrasion tester and scratched to-and-fro 50 times under a load of 1000 g. This sample was washed using a neutral detergent, and haze was measured by a haze meter. The steel wool scratch resistance was represented by (haze after scratch—haze before scratch).

13) Adhesion of Cured Coat

Each eleven cuts were made at an interval of 1.5 mm in horizontal direction and vertical direction respectively on the surface of a sample to make 100 lattice patterns, and a cellophane tape having a width of 25 mm (manufactured by Nichiban Co., Ltd.) was pressed to the lattice patterns, and released quickly toward upper-ward direction. The evaluation results are represented in terms of number of remaining lattice patterns/total number of lattice patterns (100).

14) Izod Impact Test

It was measured under conditions including an equipped notch and a thickness of ¼" according to ASTM D256.

15) Saturated Water Absorption

It was dried at 80° C., then, weight was measured, and immersed in warm water of 25° C. until weight reached equilibrium. The weight after equilibrium was measured and the saturated water absorption was calculated according to the following formula:

Saturated water absorption (%)=[(weight after water absorption−dry weight)/dry weight]×100

16) Specific Gravity

It was measured using Auto Picno Meter 1320 (manufactured by Shimadzu Corp.).

17) Light Scattering Property

A molded article was placed at an interval of 5 cm from the outer surface of a 40 W fluorescent lamp (Full White FL40SS N-37 manufactured by Matsushita Electric Industrial Co., Ltd.), and lamp image (slim line) of a fluorescent lamp lighted 2 m distant from the molded article on an extended line connecting the molded article and the fluorescent lamp was judged visually.

EXAMPLE 1

In a 2 L flask, 616 g (4 mol) of cyclohexyl acrylate, 160 g (4 mol) of paraformaldehyde having purity of 75%, 60 g (0.53 mol) of 1,4-diazabicyclo[2.2.2]octane, 616 mg of p-methoxyphenol and 120 g of t-butyl alcohol were reacted at 80° C. for 5 days with bubbling of air. After the completion of the reaction, this reaction solution was poured into 3 L of methanol and stirred for 30 minutes. Then, this mixed solution was allowed to stand still at −20° C., to obtain 520 g (yield: 74.2%) of dicyclohexyl-2,2'-[oxybis(methylene)]bis-2-propenoate (hereinafter, abbreviated as "DCHOMP") as a white crystal.

Into a 1 L flask containing 480 ml of toluene as a solvent were added 42 g of DCHOMP and 78 g of methyl methacrylate (hereinafter, referred to as "MMA"). To this solution was added 120 mg of azobisisobutyronitrile (hereinafter, abbreviated as "AIBN") as a polymerization initiator and the mixture was stirred for 40 minutes with purging with nitrogen. Then, the mixture was heated to 80° C. to initiate polymerization and the polymerization was conducted for 5 hours.

This reaction solution was poured into a large amount of methanol to precipitate a polymer which was filtrated and washed with methanol. This was dried in vacuo to obtain 111 g (yield: 93%) of a polymer in the form of a powder. This copolymer was evaluated to obtain the results shown in Table 1.

EXAMPLE 2

107 g (yield: 89%) of a copolymer was obtained, and results shown in Table 1 were obtained in the same manner as in Example 1 except that the amount of DCHOMP was 12 g and the amount of MMA was 108 g.

EXAMPLE 3

712 g (yield: 79.2%) of di(tricyclodecanyl)-2,2'-[oxybis(methylene)]bis-2-propenoate (hereinafter, abbreviated as "DTCDOMP") was obtained in the same manner as in Example 1 except that cyclohexyl acrylate was substituted by 824 g (4 mol) of tricyclodecanyl acrylate (Fancryl 513A: trade name, manufactured by Hitachi Chemical Co. Ltd.)

109 g (yield: 91%) of a copolymer was obtained in the same manner as in Examples 1 except that 42 g of DCHOMP was substituted by 36 g of DTCDOMP and the amount of MMA was changed to 84 g.

EXAMPLE 4

103 g (yield: 86%) of a copolymer was obtained in the same manner as in Example 2 except that DCHOMP was substituted by DTCDOMP. This copolymer was evaluated to obtain results shown in Table 1.

EXAMPLE 5

712 g (yield: 79.2%) of di(dicyclopentadienyl)-2,2'-[oxybis(methylene)]bis-2-propenoate (hereinafter, abbreviated as "DCPOMP") was obtained in the same manner as in Example 1 except that cyclohexyl acrylate was substituted by 816 g (4 mol) of dicyclopentadienyl acrylate (Fancryl 511A, manufactured by Hitachi Chemical Co. Ltd.)

110 g (yield: 92%) of a copolymer was obtained in the same manner as in Examples 3 except that 36 g of DTC-DOMP was substituted by 30 g of DCPOMP. This copolymer was evaluated to obtain results shown in Table 1.

EXAMPLE 6

100 g (yield: 84%) of a copolymer was obtained in the same manner as in Example 2 except that DCHOMP was substituted by DCPOMP. This copolymer was evaluated to obtain results shown in Table 1.

EXAMPLE 7

Into a 1 L flask containing 480 ml of toluene as a solvent was added 120 g dicyclohexyl-2,2'-[oxybis (methylene)]bis-2-propenoate and it was dissolved.

To this solution was added 120 mg of AIBN as a polymerization initiator and the mixture was stirred for 40 minutes with purging with nitrogen inside the flask. Then, the mixture was heated to 80° C. to initiate polymerization and the polymerization was conducted for 5 hours.

This reaction solution was poured into a large amount of methanol to precipitate a polymer which was filtrated and washed with methanol. This was dried in vacuo to obtain 110 g (yield: 92%) of a polymer in the form of a powder. This polymer was evaluated to obtain the results shown in Table 1.

EXAMPLE 8

113 g (yield: 94%) of a polymer was obtained in the same manner as in Example 7 except that DCHOMP was substituted by TCDOMP. This polymer was evaluated to obtain results shown in Table 1.

Comparative Example 1

The same procedure as in Example 1 was conducted except that a pellet of Acrypet VH (trade name, manufactured by Mitsubishi Rayon Co., Ltd.) was used as a methacrylic resin, and the same evaluation as in Example 1 was conducted to obtain results shown in Table 1.

TABLE 1

| Example | $R^1$ group in component of formula (1) in (co) polymer | Mn | Mw/Mn | Content of component of formula (1) in (co) polymer (wt. %) | Saturated water absorption (wt. %) | Total optical transmittance Tt (%) | Birefringence R (nm) | VICAT softening temperature (C.°) |
|---|---|---|---|---|---|---|---|---|
| Example 1 | Cyclohexyl | 48000 | 2.01 | 40 | 1.0 | 92 | 0~15 | 122 |
| Example 2 | Cyclohexyl | 57000 | 1.79 | 12 | 1.2 | 93 | 30~50 | 118 |
| Example 3 | Tricyclodecanyl | 49000 | 2.31 | 28 | 1.0 | 91 | 0~15 | 145 |
| Example 4 | Tricyclodecanyl | 35000 | 2.03 | 9 | 1.4 | 91 | 10~30 | 125 |
| Example 5 | Dicyclopentadienyl | 31000 | 2.25 | 23 | 1.3 | 92 | 0~15 | 140 |
| Example 6 | Dicyclopentadienyl | 30000 | 1.91 | 10 | 1.5 | 91 | 10~30 | 124 |
| Example 7 | Cyclohexyl | 51000 | 2.23 | 100 | 0.6 | 92 | 60~80 | 135 |
| Example 8 | Tricyclodecanyl | 38000 | 2.44 | 100 | 0.6 | 92 | 60~80 | 208 |
| Comparative Example 1 | — | — | — | — | 2.0 | 93 | 80~100 | 113 |

EXAMPLE 9

Into a 1 L flask containing 570 ml of dimethylfolmamide as a solvent were added 38 g dicyclohexyl-2,2'-[oxybis (methylene)]bis-2-propenoate and 62 g of MMA and they were dissolved. To this solution was added 600 mg of Pertetra A (trade name, manufactured by NOF Corp. having a purity of 20 wt. %) as a polymerization initiator and the mixture was stirred for 40 minutes with purging with nitrogen. Then, the mixture was heated to 95° C. to initiate polymerization and the polymerization was conducted for 7 hours.

This reaction solution was poured into a large amount of methanol to precipitate a polymer which was filtrated and washed with methanol. This was dried in vacuo to obtain 92 g (yield: 92%) of a polymer in the form of a powder. This copolymer was evaluated to obtain the results shown in Table 2.

EXAMPLE 10

90 g (yield: 90%) of a copolymer was obtained in the same manner as in Example 9 except that 19 g of DCHOMP and 81 g of MMA were used. This copolymer was evaluated to obtain results shown in Table 2.

EXAMPLE 11

82 g (yield: 82%) of a copolymer was obtained in the same manner as in Example 1 except that 50 g of DCHOMP and 50 g of MMA were used and 120 mg of AIBN was substituted by 200 mg of Pertetra A. This copolymer was evaluated to obtain results shown in Table 2.

TABLE 2

| | Content (wt. %) of component of formula (1) in copolymer component | Mn | Flexural strength (kg/cm$^2$) | Flexural modulus (kg/cm$^2$) | Birefringence R (nm) | VICAT softening temperature (° C.) | Saturated water absorption (wt. %) | Total optical transmittance T (%) |
|---|---|---|---|---|---|---|---|---|
| Example 9 | 40 | 98,000 | 1,000 | 31,000 | 0~15 | 122 | 1.0 | 92 |
| Example 10 | 20 | 86,000 | 1,200 | 30,000 | 20~45 | 118 | 1.2 | 92 |
| Example 11 | 55 | 140,000 | 920 | 32,000 | 15~30 | 126 | 0.9 | 91 |

EXAMPLE 12

The (co)polymers having low birefringence obtained in Examples 1, 3, 5 and 7 and the polymer in Comparative Example 1 were used to mold pickup lenses respectively for a compact disk. These lenses were evaluated by measuring change in spherical aberration and change in interference fringe under atmosphere of 60° C. and 90% RH. As a result, the lenses obtained by using the (co)polymers of Examples 1, 3, 5 and 7 revealed significantly lower changes and had excellent lens abilities under high moisture as compared with the lens obtained by using the polymer in Comparative Example 1.

EXAMPLE 13

Into a 5 L flask containing 2500 ml of toluene as a solvent were added 100 g of DTCDOMP and 400 g of MMA and they were dissolved. To this solution was added 3 g of Pertetra A as a polymerization initiator and the mixture was stirred for 40 minutes with purging with nitrogen. Then, the mixture was heated to 95° C. to initiate polymerization and the polymerization was conducted for 7 hours.

This reaction solution was poured into a large amount of methanol to precipitate a polymer which was filtrated and washed with methanol. This was dried in vacuo to obtain 465 g (yield: 93%) of a polymer in the form of a powder.

This polymer was melt-extruded at 240° C. to obtain an acrylic plate (10×10×2 mm). A part of the resulted acrylic plate was cut, and physical properties thereof were measured to find the following results.
(1) Molecular weight of polymer: Mn=102,000
(2) Composition of polymer: DTCDOMP/MMA=20/80
(3) Saturated water absorption: 1.5%
(4) Total optical transmittance: 92%
(5) VICAT softening temperature: 135° C.
(6) Weather-resistance:
  1000 h ○
  1500 h ○

EXAMPLE 14

455 g (yield: 91%) of a polymer in the form of a powder was obtained in the same manner as in Example 13 except that 200 g of DTCDOMP and 300 g of MMA were used.

This polymer was fed to an injection molding machine (IS-100, manufactured by Toshiba Machine Co., Ltd.) and a toric lens having an overall length of 80 mm, a width of 3 mm (15 mm at center part) and a thickness of 12 mm and a spherical lens having an overall length of 30 mm, a width of 3 mm (7 mm at center part) and a thickness of 12 mm were molded under condition of a cylinder temperature of 270° C., a mold temperature of 100° C. and an injection pressure of 1400 kg/cm$^2$.

A part of the resulted lens was cut, and physical properties thereof were measured to find the following results.
(1) Molecular weight of polymer: Mn=98000
(2) Composition of polymer: DTCDOMP/MMA=40/60
(3) Saturated water absorption: 1.1%
(4) Birefringence: 10×10$^{-6}$
(5) VICAT softening temperature: 140° C.
(6) Yellowing index (YI value): 1.4

Comparative Example 2

A lens for a laser beam printer was molded using a polycarbonate resin (AD9000TG: trade name, manufactured by Teijin Kasei K.K.) under condition of a cylinder temperature of 300° C., a mold temperature of 110° C. and an injection pressure of 1600 kg/cm$^2$. A part of the resulted lens was cut, and physical properties thereof were measured. As a result, it had an excellent saturated water absorption of 0.5% and an excellent VICAT softening temperature of 155° C., however, it had high birefringence of 100×10$^{-6}$.

Comparative Example 3

A lens for a laser beam printer was molded using PMMA (Acrypet VH: trade name, manufactured by Mitsubishi Rayon Co., Ltd.) under condition of a cylinder temperature of 260° C., a mold temperature of 80° C. and an injection pressure of 1400 kg/cm$^2$. A part of the resulted lens was cut, and physical properties thereof were measured. As a result, it had an excellent birefringence of 20×10$^{-6}$, but had a low VICAT softening temperature of 115° C., and had a high saturated water absorption of 2.1%

EXAMPLE 15

455 g (yield: 91%) of a polymer in the form of a powder was obtained in the same manner as in Example 13 except that 250 g of DTCDOMP and 250 g of MMA were used. The resulting polymer had a Tg of 150° C.

This polymer was treated under condition of a cylinder temperature of 290° C., a mold temperature of 80° C. and a locking pressure of 20 ton to mold an optical disk molding substrate having an outer diameter of 120 mm and a thickness of 0.6 mm carrying on the surface thereof pits and grooves at a track pitch of 0.8 to 1.0 μm. This substrate had a birefringence of 15×10$^{-6}$ and a saturated water absorption of 0.9%.

Then, an aluminum film having a thickness of 70 nm was formed by a vacuum deposition method, and an optical disk was produced. Specifically, the film forming was conducted under the following conditions.

Pre-exhausting: Exhausting time: 0.5 h, Degree of vacuum: 1×10$^{-5}$ Torr

Evaporation method: Resistance heating
Film forming speed: 0.8 to 1.2 nm/sec

Comparative Example 4

A polycarbonate resin (AD9000TG: trade name, manufactured by Teijin Kasei K.K.) was treated under condition of a cylinder temperature of 370° C., a mold temperature of 120° C. and a locking pressure of 10 ton to mold an optical disk molding substrate having an outer diameter of 120 mm and a thickness of 0.6 mm carrying on the surface thereof pits and grooves at a track pitch of 0.8 to 1.0 µm. This substrate had a saturated water absorption of 0.4%, but had a high birefringence of $75 \times 10^{-6}$.

EXAMPLE 16

In a 2 L flask, 344 g (4 mol) of methyl acrylate, 160 g (4 mol) of parafolmaldehyde having a purity of 75%, 60 g (0.53 mol) of 1,4-diazabicyclo [2.2.2]octane and 600 mg of p-methoxyphenol were reacted for 6 hours with air bubbling. After the completion of the reaction, ether was added and the organic phase was washed with 1 N hydrochloric acid. The organic phase was dried with anhydrous sodium sulfate, then, the solvent was distilled to obtain a white solid. This white solid was re-crystallized from hexane to obtain 290 g (yield: 68%) of dimethyl-2,2'-[oxybis(methylene)]bis-2-propenoate (hereinafter, abbreviated as "DMOMP") as a whiter crystal.

Into a flask containing 4 L of toluene as a solvent, 200 g of DMOMP was added and dissolved. To this solution was added 600 mg of AIBN as a polymerization initiator, and the resulted mixture was stirred for 40 minutes while purging with nitrogen. Then, the mixture was heated to 80° C. to initiate polymerization and the polymerization was conducted for 5 hours.

This reaction solution was poured into a large amount of methanol to precipitate a polymer which was filtrated and washed with methanol. This was dried under vacuo to obtain 180 g (yield: 90%) of a polymer in the form of a powder. This powder had a Tg of 170° C. and was used as a core material.

A copolymer of trifluoroethyl α-fluoroacrylate/methylα-fluoroacrylate=85/15 (molar ratio) was used as a clad material.

These polymers were fed respectively to screw type extruders and discharged through a concentric complex nozzle having two-layer structure to produce POF of core/clad structure having a fiber diameter of 1000 µm and a core diameter of 980 µm.

This POF had a light transmission loss of 220 dB/km (measuring method: 50 m–5 m cut back method, wavelength: 650 nm, incident NA=0.1). This POF was treated at 125° C. for 1000 hours to find a increase in light transmission loss of 20 dB/km or less which means excellent heat resistance.

EXAMPLE 17

POF of core/clad structure having a fiber diameter of 1000 µm and a core diameter of 980 µm was produced in the same manner as in Example 16 except that a polymer obtained in the same manner as in Example 15 was used as a core material. This POF had a light transmission loss of 230 dB/km, and was treated at 125° C. for 1000 hours to find a increase in light transmission loss of 25 dB/km or less which means excellent heat resistance.

Comparative Example 5

POF was produced in the same manner as in Example 16 except that a polycarbonate resin (Youpiron: trade name, manufactured by Mitsubishi Gas Chemical Co., Inc.) was used. This POF had a light transmission loss of 800 dB/km, and was treated at 125° C. for 1000 hours to find a increase in light transmission loss of 40 dB/km.

EXAMPLE 18

A polymer obtained in the same manner as in Example 15 was shaped into a strand through an extruder equipped with a 30 mmφ double bent (barrel temperature: about 250° C.), and pelletized. A light inductive material of longitudinal length 15 cm×lateral length 15 cm×thickness 2 mm was produced by injection molding using the resulted pellet. As the injection molding machine, IS-100 manufactured by Toshiba Machine Co., Ltd. was used, and molding was conducted under conditions of a cylinder temperature of 250° C., a mold temperature of 100° C. and an injection pressure of 1350 kg/cm².

A part of the resulted acrylic plate was cut, and physical properties thereof were measured to find the following results.
(1) Molecular weight of polymer: Mn=95000
(2) Composition of polymer: DTCDOMP/MMA=50/50
(3) Saturated water absorption: 0.9%
(4) Total optical transmittance: 91%
(5) VICAT softening temperature: 155° C.
(6) Yellowing Index (YI value): 1.5

EXAMPLE 19

The following two kinds of curing solutions were prepared.
1) Composition of Curing Solution 1

| | |
|---|---|
| Dipentaerythritol hexaacrylate | 39 parts |
| Dipentaerythritol pentaacrylate | 28 parts |
| Tetrahydrofurfuryl acrylate | 35 parts |
| 2-Hydroxy-4-n-octoxybenzophenone | 10 parts |
| Benzoinisopropyl ether | 4 parts |

To the above-described composition, 75 parts of isopropyl alcohol and 75 parts of toluene were added as organic solvents to obtain Curing solution 1.
1) Composition of Curing Solution 2

| | |
|---|---|
| Dipentaerythritol hexaacrylate | 33 parts |
| Dipentaerythritol pentaacrylate | 22 parts | trimethylolethane/succinic acid/acrylic acid=2/1/4.4

| | |
|---|---|
| (molar ratio) | 10 parts |
| Tetrahydrofurfuryl acrylate | 35 parts |
| 2,4-dihydroxybenzophenone | 10 parts |
| Benzoin ethyl ether | 4 parts |

To the above-described composition, 75 parts of isopropyl alcohol and 75 parts of n-butyl acetate were added as organic solvents to obtain Curing solution 2.

These two kinds of curing solutions were coated on one surface of the light-inductive material obtained in Example 18, then, allowed to stand for 5 minutes at room temperature to evaporate the organic solvent. Then, the coat was cured by irradiation by a high pressure mercury lamp ("Eye Graphic" H08L21). Abrasion resistance of the cured coat, adhesion of the cured coat and weather-resistance of the inductive material were evaluated to find results shown in Table 3.

Referencial Example 1

455 g (yield: 91%) of a powdery polymer was obtained under the same conditions as in Example 14. Thus obtained pyran ring-containing polymer had physical properties as shown below.
(1) Molecular weight of polymer: Mn=97000
(2) Composition: DTCDOMP/MMA=40/60 (parts)
(3) Glass transition temperature: 135° C.

This polymer was shaped into a strand through an extruder equipped with a 30 mmφ double bent (barrel temperature: about 250° C.), and pelletized.

EXAMPLE 20

A polycarbonate resin and the pyran ring-containing polymer obtained in Referencial Example 1 were co-extruded under the following conditions to obtain a laminated sheet having a thickness of a polycarbonate resin layer of 3 mm and a thickness of a pyran ring-containing polymer layer of 0.1 mm. Weather-resistance test results of this sheet are shown in Table 4.

1) Extruder

For polycarbonate resin

Screw diameter: 50 mmφ

Barrel temperature 280° C./280° C./280° C.

For pyran ring-containing polymer

Screw diameter: 20 mmφ

Barrel temperature 270° C./270° C./270° C.

2) Die

Temperature: 270° C.

Width: 1000 mm

3) Glossy Three-roll Temperature

First roll (middle): 125° C.

Second roll (lower): 142° C.

Third roll (upper): 118° C.

4) Drawing Speed: 1.5 m/minute

EXAMPLE 21

To 100 parts of the polymer obtained in Referencial Example 1 was added 0.2 part of 2,4-di-t-butylphenyl-3'-5'-di-t-butyl-4'-hydroxybenzoate (Viosorb 80: trade name, manufactured by Kyodo Yakuhin K.K.), and the mixture was charged into a twin-cylinder brabender and mixed for 5 minutes. The mixture was shaped into a strand through an extruder equipped with a 30 mmφ double bent (barrel temperature: about 250° C.), and pelletized.

A sheet was produced in the same manner as in Example 20 using this pellet and polycarbonate resin, and results shown in Table 4 were obtained.

Comparative Example 6

A sheet (thickness: 3 mm) singly composed of a polycarbonate resin was subjected to a weather-resistance test to obtain result shown in Table 4.

TABLE 3

|  | Abrasion resistance (%) | Adhesion | Weather resistance | |
| --- | --- | --- | --- | --- |
|  |  |  | 1000 hours | 1500 hours |
| Curing solution 1 | 0.3 | 100/100 | ○ | ○ |
| Curing solution 2 | 0.3 | 100/100 | ○ | ○ |

TABLE 4

|  | Yellowing Index (YI value) | | |
| --- | --- | --- | --- |
|  | 0 hour | 1000 hours | 1500 hours |
| Example 20 | 1.5 | 2.2 | 2.9 |
| Example 21 | 1.5 | 1.8 | 2.0 |
| Comparative Example 6 | 1.5 | 5.5 | 10.4 |

EXAMPLE 22

455 g (yield: 91%) of a polymer was obtained in the same manner as in Example 14 except that 250 g of DTCDOMP and 250 g of MMA were used.

Physical properties of the resulted polymer were measured to find that the molecular weight of the polymer Mn was 95000 and the ratio by weight of the polymer composition DTCDOMP/MMA was 50/50.

Referencial Example 2

2 parts of tetraethoxysilane, 0.5 part of γ-methacryloyloxypropyldimethoxysilane and 97.5 parts of octamethylcyclotetrasiloxane were mixed to obtain 100 parts of a siloxane mixture. The above-described mixture was emulsified at a pressured of 300 kg/cm² into 200 parts of distilled water into which sodium dodecylbenzenesulfonate and dodecylbenzenesulfonic acid respectively in an amount of 0.67 part had been dissolved, and 100 parts of an organosiloxane latex was added to this emulsion and the mixture was pre-mixed by a homomixer at 10,000 rpm to obtain a homogenized material. This mixed solution was transferred to a separable flask equipped with a condenser and a stirring blade, and heated for 5 hours at 80° C. with stirring to mix, then, left at 20° C., and 48 hours later, this latex was neutralized with an aqueous sodium hydroxide solution to pH 7.3 for completion of the polymerization to obtain polyorganosiloxane latex. The resulted polyorganosiloxane latex had a degree of polymerization of 89.7% and an average particle size of 0.23 µm.

117 parts of this polyorganosiloxane latex was charged into a separable flask equipped with s stirred and to this was added 57.5 parts of distilled water, after nitrogen purge, the mixture was heated to 50° C. and, a mixture of 0.002 part of ferrous sulfate, 0.006 part of disodium ethylenediaminetetraacetate, 0.26 part of Rongalit and 5 parts of distilled water was charged and a mixture of 43.95 parts of n-butyl acrylate, 1.05 parts of allyl methacrylate and 0.26 part of tert-butyl hydroperoxide was charged, and radical polymerization was allowed to initiate. Then the inner temperature was kept at 65° C. for 1 hour to complete the polymerization to obtain an acrylic elastomer latex. A part of this elastomer was collected and the average particle size measured was 0.25 µm. This collected latex was dried to obtain a solid. It was extracted with toluene at 90° C. for 12 hours, and the gel content measured was 96.5% by weight.

Then, a mixture of 0.2 part of tert-butyl hydroperoxide and 20 parts of MMA was added to this elastomer latex at 65° C. over 30 minutes dropwise, then, kept at 70° C. for 2 hours to complete graft polymerization to the elastomer. The degree of polymerization of MMA was 98.5%. The resulted latex was added to 200 parts of hot water containing 1.5% by weight of calcium chloride dropwise, coagulated, separated and washed, then, dried at 75° C. for 16 hours to obtain 97 parts of a dried powder of a reinforcing additive having multilayered particle structure containing the acrylic elastomer as the core material and PMMA as the outer layer material.

EXAMPLE 23

The polymer obtained in Example 3 (85% by weight) and the reinforcing additive obtained in Reference Example 2 (15% by weight) were blended, and the mixture was shaped into a strand through an extruder equipped with a 30 mmϕ double bent (barrel temperature: about 250° C.), and pelletized. A molded specimen was produced by injection molding using the resulted pellet. As the injection molding machine, IS-100 manufactured by Toshiba Machine Co., Ltd. was used, and molding was conducted under conditions of a cylinder temperature of 250° C., a mold temperature of 80° C. and an injection pressure of 1350 kg/cm$^2$.

Physical properties of the resulted molded article were measured to find results as shown below.
Flexural strength: 1000 kg/cm$^2$
Izod impact strength: 15 kg·cm/cm
VICAT softening temperature: 130° C.
Transparency: excellent
Yellowing Index (YI value): 1.4

As described above, a transparent resin excellent in impact resistance and heat resistance was obtained.

EXAMPLE 24

To 100 parts of the polymer obtained in Example 22 was added 0.2 part of 2,4-di-t-butylphenyl-3'-5'-di-t-butyl-4'-hydroxybenzoate (Viosorb 80: trade name, manufactured by Kyodo Yakuhin K.K.), and the mixture was charged into a twin-cylinder brabender and mixed for 5 minutes. The mixture was shaped into a strand through an extruder equipped with a 30 mmϕ double bent (barrel temperature: about 250° C.), and pelletized. A flat plate (longitudinal length 100 mm×lateral length 100 mm×thickness 3.2 mm) was produced by injection molding using the resulted pellet. As the injection molding machine, IS-100 manufactured by Toshiba Machine Co., Ltd. was used, and molding was conducted under conditions of a cylinder temperature of 250° C., a mold temperature of 100° C. and an injection pressure of 1350 kg/cm$^2$.

Physical properties of the resulted flat plate were shown below. Results of weather-resistance test are shown in Table 5.

Total optical transmission: 91%
VICAT softening temperature: 155° C.
Yellowing Index (YI value): 1.5

EXAMPLE 25

A flat plate was obtained in the same manner as in Example 24 except that 2-(5-methyl-2-hydroxyphenyl) benzotriazole was used as the ultraviolet ray absorber, and results of weather-resistance test thereof are shown in Table 5.

Comparative Example 7

A flat plate was obtained in the same manner as in Example 24 except that a polycarbonate resin (AD9000TG: trade name, manufactured by Teijin Kasei K.K.) was used as the polymer, and results of weather-resistance test thereof are shown in Table 5.

EXAMPLE 26

A flat plate was obtained in the same manner as in Example 24 except that bistridecanylpentaerythrithol diphosphite (Mark PEP-13, trade name, Adeka Agus Corp.) was used as an antioxidant instead of the ultraviolet ray absorber. Physical properties of the flat plate are shown below.

Total optical transmission: 92%
VICAT softening temperature: 155° C.
Yellowing Index (YI value): 1.0

EXAMPLE 27

The polymer obtained in Example 22 was shaped into a strand through an extruder equipped with a 30 mmϕ double bent (barrel temperature: about 250° C.), and pelletized. A lamp lens having outer dimension of 200 mm×100 mm×50 mm shown in FIG. 5 was produced by injection molding using the resulted pellet. As the injection molding machine, IS-100 manufactured by Toshiba Machine Co., Ltd. was used, and molding was conducted under conditions of a cylinder temperature of 250° C., a mold temperature of 100° C. and an injection pressure of 1350 kg/cm$^2$.

A part of the resulted lamp lens was cut and physical properties thereof were measured to find the following results.
(1) Molecular weight of polymer: Mn=95000
(2) Composition of polymer: DTCDOMP/MMA=50/50
(3) Saturated water absorption: 0.9%
(4) Total optical transmittance: 91%
(5) VICAT softening temperature: 155° C.
(6) Yellowing Index (YI value): 1.5
(7) Specific Gravity: 1.15 g/cm$^3$

EXAMPLE 28

The two kinds of curing solutions used in Example 19 were coated on one surface of a lamp lens, then, allowed to stand for 5 minutes at room temperature to evaporate the organic solvent. Then, the coat was cured by irradiation by a high pressure mercury lamp ("Eye Graphic" H08L21). Abrasion resistance of the cured coat, adhesion of the cured coat and weather-resistance of the lamp lens were evaluated to find results shown in Table 6.

TABLE 5

| | Weather resistance | | |
|---|---|---|---|
| | 500 hours | 1000 hours | 1500 hours |
| Example 24 | ○ | ○ | ○ |
| Example 25 | ○ | ○ | ○ |
| Comparative Example 7 | ○ | x | x |

TABLE 6

| | Abrasion resistance (%) | Adhesion | Weather resistance 1000 hours | Weather resistance 1500 hours |
|---|---|---|---|---|
| Curing solution 1 | 0.3 | 100/100 | ○ | ○ |
| Curing solution 2 | 0.3 | 100/100 | ○ | ○ |

EXAMPLE 29

The polymer (refractive index: 1.50) obtained in Example 3 (97% by weight) and calcium carbonate (refractive index: 1.58) having a weight-average particle size of 5 μm (3% by weight) were blended, and the mixture was shaped into a strand through an extruder equipped with a 30 mmφ double bent (barrel temperature: about 250° C.), and pelletized. A sheet molded article having dimension of 100 mm×100 mm×2 mm was produced by injection molding using the resulted pellet. As the injection molding machine, IS-100 manufactured by Toshiba Machine Co., Ltd. was used, and molding was conducted under conditions of a cylinder temperature of 250° C., a mold temperature of 80° C. and an injection pressure of 1350 kg/cm².

Physical properties of the resulted molded article were measured to find results shown below.

VICAT softening temperature: 130° C.

Total optical transmission: 73%

Light scattering property: excellent (no lamp image)

INDUSTRIAL APPLICABILITY

According to the present invention, a (co)polymer having low birefringence was obtained excellent in transparency, heat-resistance, low hydrophilia and mechanical strength. This (co)polymer can be applied owing its properties to lenses such as a light pickup lens, a lens for a laser beam printer, and the like, various optical uses such as a disk, optical fiber, light transmission material, light-inductive material and the like, and display materials such as a signboard, polycarbonate laminated sheet and the like.

According to the method for producing a (co)polymer having low birefringence, a (co)polymer having low birefringence having a molecular weight of 50000 or more can be synthesized easily.

According to the present invention, a resin composition having excellent optical properties and high impact-resistance and heat resistance is provided. Further, according to the present invention, a resin composition excellent in weather-resistance and oxidation-degradation-resistance is provided.

The lamp lens of the present invention has high transparency and heat-resistance and excellent weather resistance in spite of its light weight.

The light scattering sheet molded article of the present invention is excellent in total optical transmittance, light scattering property and heat-resistance, and can be used as an illumination cover, various signboards, and display.

What is claimed is:

1. A copolymer having low birefringence consisting of a repeating unit having formula (1) and a repeating unit of a (meth)acrylate

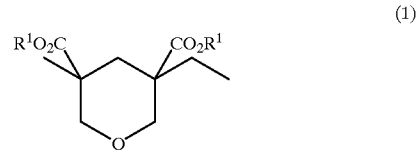

(1)

wherein $R^1$ is tricyclodecanyl, dicyclopentadienyl, adamantyl or t-butylcyclohexyl.

2. The copolymer according to claim 1, wherein the birefringence R measured of a molded article of the copolymer having a thickness of 2 mm is 40 nm or less.

3. The copolymer according to claim 1, wherein the number-average molecular weight Mn of the copolymer is 50,000 to 1,000,000.

4. The copolymer according to claim 1, wherein the (meth)acrylate monomer is methyl methacrylate, ethyl methacrylate, cyclohexyl methacrylate or methyl acrylate.

5. A method for producing the copolymer having low birefringence of claim 1, comprising:

copolymerizing a (meth)acrylate monomer and an α-substituted acrylate monomer of formula (2) in the presence of a peroxide polymerization initiator having at least two O—O bonds in its molecule

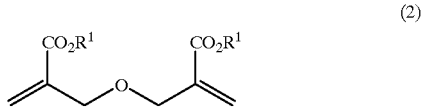

(2)

wherein $R^1$ is tricyclodecanyl, dicyclopentadienyl, adamantyl or t-butylcyclohexyl.

6. A light pickup lens molded from the copolymer of claim 1.

* * * * *

UNITED STATES PATENT AND TRADEMARK OFFICE
CERTIFICATE OF CORRECTION

PATENT NO.         : 6,262,214 B1
APPLICATION NO. : 09/297062
DATED              : August 28, 2007
INVENTOR(S)        : Mark Soll and Albert Boeckh Page 1 of 1

It is certified that error appears in the above-identified patent and that said Letters Patent is hereby corrected as shown below:

IN THE CLAIMS:

Column 45, claim 10 should read:

-- The method of claim 3 or 4 wherein in the formulation,

- the anionic surfactant is an alkaline stearate, sodium abietate; an alkyl sulphate; sodium dodecylbenzenesulphonate, sodium dioctylsulphosuccinate; and a fatty acid;
- the cationic surfactant is water-soluble ~~quatemary~~ quaternary ammonium salts of formula $N^+R'R''R'$ "R" " $Y^-$ in which the radicals R independently are hydrocarbon radicals, optionally hydroxylated, and $Y^-$ is an anion of a strong acid; cetyltrimethylammonium bromide or octadecylamine hydrochloride.
- the amine salt is an amine salt of $N^+R'R''R'$ " in which the radicals R independently are optionally hydroxylated hydrocarbon radicals;
- the non-ionic surfactant is optionally a polyoxyethylenated sorbitan ester, a polyoxyethylenated alkyl ether; polyethylene glycol stearate, a polyoxyethylenated derivative of castor oil, a polyglycerol ester, a polyoxyethylenated fatty alcohol, a polyoxyethylenated fatty acid, a copolymer of ethylene oxide and propylene oxide; and
- the amphoteric surfactant is lauryl-substituted betaine compounds. --

Signed and Sealed this

Eighteenth Day of December, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,262,214 B1 |
| APPLICATION NO. | : 09/297062 |
| DATED | : July 17, 2001 |
| INVENTOR(S) | : Akira Yanagase et al. |

Page 1 of 1

It is certified that error appears in the above-identified patent and that said Letters Patent is hereby corrected as shown below:

This certificate supersedes certificate of correction issued December 18, 2007. The certificate should be vacated since no certificate of correction was granted for this patent number.

Signed and Sealed this

Twenty-ninth Day of January, 2008

JON W. DUDAS
*Director of the United States Patent and Trademark Office*